United States Patent [19]
Hughes, Jr.

[11] 3,825,717
[45] July 23, 1974

[54] HAMMERING CIRCUIT FOR STUD WELDING APPARATUS

[75] Inventor: James S. Hughes, Jr., Bellmawr, N.J.

[73] Assignee: Omark Industries, Inc., Portland, Oreg.

[22] Filed: Feb. 14, 1973

[21] Appl. No.: 332,390

[52] U.S. Cl. .................................. 219/98, 219/108
[51] Int. Cl. ....................... B23k 9/00, B23k 11/04
[58] Field of Search ........................ 219/108, 98, 99

[56] References Cited

UNITED STATES PATENTS

| | | | |
|---|---|---|---|
| 2,110,832 | 3/1938 | Hogg et al. | 219/98 |
| 3,059,095 | 10/1962 | Graham | 219/98 |
| 3,162,746 | 12/1964 | Ritter et al. | 219/98 |
| 3,349,217 | 10/1967 | Helms et al. | 219/109 X |
| 3,456,090 | 7/1969 | Wenrich et al. | 219/98 |
| 3,696,227 | 10/1972 | Wenrich et al. | 219/98 X |

Primary Examiner—J. V. Truhe
Assistant Examiner—Hugh D. Jaeger
Attorney, Agent, or Firm—Charles F. Duffield

[57] ABSTRACT

Stud welding apparatus including circuitry for effecting a hammering action of the stud against the workpiece to break through paint, scale, etc. to establish good electrical contact. The stud welding gun includes a lifting solenoid and the hammering is effected, in one species, by converting the solenoids normal full wave rectified input to half wave rectified output and in a second embodiment by interrupting the DC power supply to the gun solenoid through a solid state device by an associated frequency variable multivibrator. Hammering is discontinued upon the sensing of the establishment of welding current across the stud and workpiece in one species and in a second by continuing hammering until the electrical resistance across the stud and workpiece reduces to a predetermined level. A safety timer circuit is employed to discontinue hammering after a predetermined time irregardless of the establishment of acceptable electrical contact.

11 Claims, 2 Drawing Figures

HAMMERING CIRCUIT FOR STUD WELDING APPARATUS

BACKGROUND OF THE INVENTION

The present invention applies generally to the art of stud welding and more specifically to improvements to such stud welding apparatus for effecting good electrical contact between the stud and workpiece.

In stud welding apparatus of the type involved, a discrete stud is placed in the chuck of a stud welding gun and the stud placed in contact with a metallic workpiece to which it is to be welded. Thereafter and in time sequence, a pilot arc is established and the stud withdrawn from the workpiece followed by heavy welding current. After a predetermined time, the stud is returned to the workpiece with resultant fusion bonding of the stud to the workpiece.

The entire stud welding process depends upon good electrical contact being initially maintained between the stud and workpiece. In many applications such as aboard ships and in boilers and the like, considerable amounts of paint, rust, corrosion and scale are present and prevent good electrical contact from being established between the stud and the workpiece. In such situations, it is necessary that the particular area to which the stud is to be welded must be scraped free of the paint or scale before the weld can be effected. This is, of course, very time consuming and costly.

OBJECT AND SUMMARY OF INVENTION

It is the object of the present invention to overcome the foregoing disadvantages of stud welding guns operating under high resistance conditions by providing a stud welding gun which will repeatedly hammer the stud against the workpiece until good electrical contact is established and thereafter proceed with the normal weld cycle.

The foregoing object of the present invention is carried out by two different embodiments. In both embodiments, the normal lifting solenoid doubles as both the lifting solenoid and the driving element to effect the hammering action.

In the first embodiment, the input to the gun solenoid is a rectified AC. The rectifier is a full wave bridge which can be converted to a half wave bridge. The gun solenoid is responsive to the full wave output of the bridge to pull in and stay in whereas when half wave is applied to the gun solenoid, the gun solenoid will pull in and drop out with each half cycle.

At the beginning of the welding sequence, the bridge is in half wave configuration. The half wave is applied to the gun solenoid and the solenoid will move the chuck and its stud in reciprocating or hammering motion against the workpiece. In this embodiment, the pilot arc circuit is hot. Relay means in circuit with the pilot arc sense the breakthrough of the paint or scale at which time a current begins to flow and thereafter the relays immediately convert the half wave bridge to full wave to discontinue the hammering operation. At this time the remainder of the controls in the gun controller are actuated to commence the normal welding cycle.

In the second embodiment, wherein a DC power supply is employed, a likewise DC input or driving force to the gun solenoid is employed. A semiconductor device is placed in circuit with the gun solenoid. The semiconductor device is cyclically driven by a multivibrator or, more specifically, a frequency variable operational amplifier. The cycling on and off of the semiconductor device interrupts the DC current through the lifting coil and effects the hammering action.

In the second embodiment, a relay device is placed in series with the stud and workpiece and senses the establishment of electrical contact whereupon the relay is pulled in and discontinues operation of the operational amplifier to, in turn, discontinue the hammering action. Simultaneously, the relay actuates the controller to begin the normal welding cycle.

The first embodiment of hammering circuit employs timing means to discontinue hammering after a predetermined time.

Other objects and advantages of the present invention will become apparent to those skilled in the art from the detailed description thereof which follows taken in conjunction with the drawings.

DETAILED DESCRIPTION OF INVENTION

Figure 1:
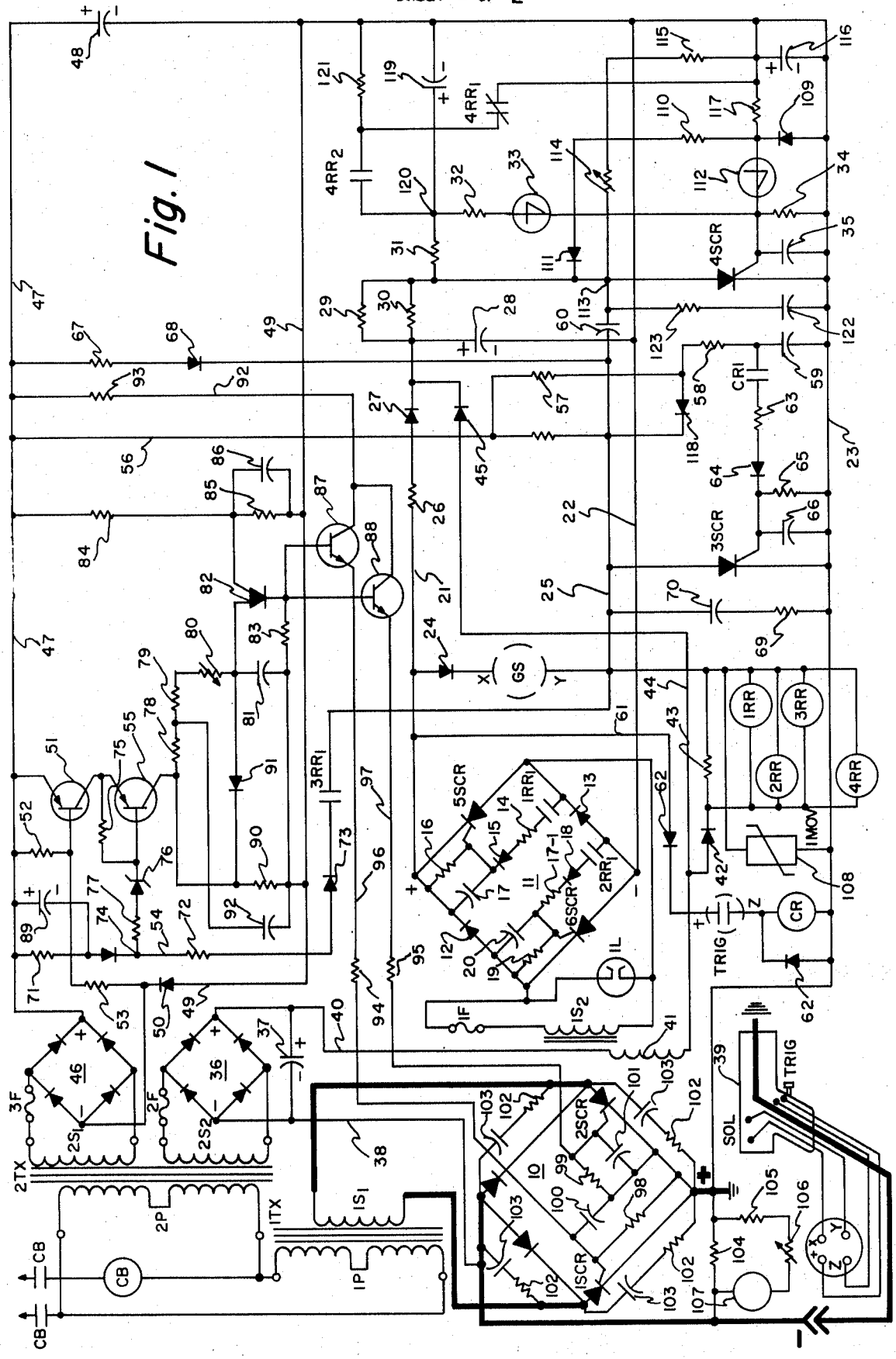
FIG. 1 is a schematic of the circuitry of an entire welding apparatus operating from an AC power supply and including one embodiment of the hammering circuit of the present invention.

The first embodiment of the hammering circuit of the present invention is shown in FIG. 1. In this embodiment, the hammering circuit is shown in conjunction with the remainder of the necessary operative circuitry of a complete stud welding apparatus in use with an AC power supply. The description of this circuit will be made in terms of a complete operating sequence.

The beginning of the operational sequence is started by closing circuit breaker CB to energize transformers 1TX and 2TX. Transformer 1TX through primary 1P drives one of two secondaries 1S1. This energizes the main welding bridge 10. The main welding bridge 10 includes two SCRs in two of the legs and two regular diodes in the other two legs of the bridge. At this point in the operational sequence, the two SCRs in adjacent legs of the bridge are turned off and the bridge thus has no output. The details of this bridge will be described more in detail later.

Transformer 1TX also drives a second secondary 1S2 which, in turn, energizes a second control bridge 11. Bridge 11 includes two diodes 12 and 13 in opposite legs and two SCRs, 5SCR and 6SCR in the other two opposite legs.

The gating for 5SCR is through relay contacts 1RR1, current limiting resistor 14 and diode 15 to the gate of the SCR. A leakage suppression resistor 16 is connected between the gate and cathode of the SCR. A filter capacitor 17 is utilized between the gate and cathode of the SCR. Gating for 6SCR is accomplished in an identical manner through reed relay contacts 2RR1, diode 18, and voltage limiter resistor 17-1. Filtering capacitor 20, leakage suppression resistor 19 are provided as in the case of 5SCR.

Reed relay contacts 1RR1 and 2RR1 are normally open and will be closed in the sequence as hereinafter described. While these contacts are open, 5SCR and 6SCR are turned off and the control bridge 11 is putting out half wave output. When reed relay contacts 1RR1 and 2RR1 are closed, as hereinafter described, the bridge will be converted to a full wave output.

The output of the control bridge 11 is across the positive bus line 21 and the negative bus lines 22 and 23. The positive output terminal of the control bridge 11, via bus 21, is applied to the gun solenoid GS through diode 24 and conductor 25 to the anode of 3SCR. At this point in the sequence, 3SCR is turned off and accordingly the gun solenoid is not energized.

The positive output of the control bridge 11 is also extended via the positive bus 21 through a current limiting resistor 26 and diode 27 across a filtering capacitor 28. The peak output of the control bridge 11 is approximately 170 volts and the filtered steady DC voltage across the filtering capacitor 28 approximately 150 volts at this time. The voltage on capacitor 28 is applied through two parallel current limiting resistors 29 and 30 to the anode of 4SCR.

At this point in the sequence, 4SCR is turned on. Turn on of 4SCR occurs by reason of the current path through resistors 31 and 32 and silicon unilateral switch 33 to the gate of 4SCR. A gate to cathode resistor 34 and capacitor 35 complete the well known turn on circuit for the SCR.

Considering that initially 4SCR is off, the voltage on capacitor 28 will be applied across resistors 31 and 32 to silicon unilateral switch 33. As this voltage rises on capacitor 119 to the turn on point of silicon unilateral switch 33, then the voltage drop across resistor 34 will be applied across capacitor 35 until the turn on voltage is applied to the gate of 4SCR whereupon the SCR will be turned on. Once turn on has occurred, the voltage applied to resistor 31 will drop substantially to ground and the gating potential to 4SCR removed. However, due to the filtered DC on capacitor 28, 4SCR will remain turned on until commutated off as hereinafter described.

Turning now to another portion of the circuitry, transformer 2TX drives two secondaries, 2S1 and 2S2. Secondary 2S2 is applied across a pilot arc bridge 26. The peak output of the pilot arc bridge is approximately 100 volts and is applied across a large pilot arc capacitor 37. The output of the pilot arc bridge 36 and energy stored in the pilot arc capacitor 37 are applied, on one side, through a conductor 38 to the stud welding conductor and ultimately to the stud held in the stud welding gun 39. The other side of the output of the bridge is applied via a conductor 40 across a pilot arc choke 41, diode 42, resistor 43 to the anode of 3SCR. At this point in the sequence of operation, 3SCR is turned off and, accordingly, no pilot arc current will flow until 3SCR is turned on. A parallel current path is formed from the pilot arc choke 41 through conductor 44 and diode 45 across the filter capacitor 28. This parallel path serves to absorb the magnetic energy of the pilot arc choke when the field surrounding the choke 41 collapses following turn off of 3SCR. In this manner, high voltage is absorbed by the capacitor 28 and serves to protect 3SCR.

Transformer 2TX also drives secondary 2S1 and powers a second control bridge 46. Bridge 46 puts out an approximate 33 volts peak. The positive side of the bridge 46 is applied over a positive bus line 47 to a filtering or smoothing capacitor 48. The opposite side of the bridge 46 is connected via a negative bus line 49 through diode 50 to the opposite side of the bridge 46.

The full wave output of bridge 46 is applied via conductor 47 to the emitter of a transistor 51. Bias upon transistor 51 is applied through an emitter to base resistor 52 and current limiting resistor 53 connected to the negative side of bridge 46. In this configuration, the full wave output of bridge 46 turns transistor 51 on and off with each half cycle of output of bridge 46.

At this point in the sequence, reed relay contacts 3RR1 are open and no current is flowing in conductor 54 and transistor 55 is thus turned off. The remainder of the circuitry associated with transistor 55 and its function will be described hereinafter in the order and the sequence at which such circuitry comes into use.

At this point in the sequence of operations, the positive potential on bus line 47 is applied through conductor 56 and current limiting resistors 57 and 58 to charge capacitor 59 connected to the negative bus line 23. Also at this time, the output of the pilot arc bridge via choke 41, diode 42 and resistor 43 as well as the output of control bridge 11 through diode 24 and the gun solenoid has charged capacitor 60 to the value of the output of the bridges.

At this point in the sequence, the trigger (trig) on the welding gun is closed. A current path is completed from the positive side of the bridge through conductor 61 across diode 62 and the trigger to energize relay CR connected to the negative bus. A diode 62 across control relay CR in a reverse direction absorbs the back emf of the relay upon deenergization in a well known manner.

When relay CR is energized, relay contacts CR1 close. As this occurs, the energy stored in capacitor 59 discharges through resistor 63, diode 64 across resistor 65 to ground. The potential buildup across resistor 65 operates across filtering capacitor 66 to turn on 3SCR. A current path is completed from bridge 46 along bus line 47, current limiting resistor 67 and diode 68 through SCR. This current path serves to maintain 3SCR on until commutated off as hereinafter described. A series resistor 69 and capacitor 70 are placed across 3SCR to protect the SCR against transients and premature turn on.

As 3SCR turns on, a current path is now formed through the gun solenoid to ground. At this point, control bridge 11 is operating on half wave. The inertia of the gun solenoid and residual magnitism of the core are designed such that the solenoid core will react to the half wave to pull in and drop out at the frequency of the half wave current but not at the frequency of the full wave output of the bridge. Accordingly and at this time, the solenoid will be rising and dropping the stud into contact with the workpiece in a hammering fashion.

When 3SCR turns on, the pilot arc potential is also applied through 3SCR to ground thus making the stud "hot" as it is hammering upon the workpiece. If the resistance across the stud and workpiece is high due to, for example, paint or scale, little or no pilot arc current will flow through resistor 43. When the stud has finally broken through the paint or scale, then a large pilot arc current will flow and a voltage drop will be created across resistor 43. As this occurs, reed relays 1RR, 2RR, 3RR and 4RR will pull in and a further sequence of events will occur as hereinafter described.

Reed relays 1RR and 2RR are extremely fast and will pull in closing their respective contacts 1RR1 and 2RR1 in the control bridge 11 before the solenoid can complete another hammering cycle thus preventing welding of the stud tip. As these contacts close, 5SCR and 6SCR are turned on and the control bridge 11 converts from half wave to full wave output. The full wave output is then applied across the gun solenoid which has theretofore been hammering with the half wave. Upon the presence of the full wave output, the gun solenoid will pull to a retracted position and remain retracted until 3SCR is turned off as hereinafter described.

Simultaneously with the actuation of the gun solenoid to a retracted position, reed relay 3RR also pulls in and closes contacts 3RR1. With the closing of contacts 3RR1, a current path is established from control bridge 46 through resistors 71, 72, diode 73 through the 3RR1 relay contacts to ground across 3SCR. As current begins to flow in resistors 71 and 72, the voltage at point 74 between resistors 71 and 72 will drop toward ground and permit transistor 55 to be turned on through zener diode 76 and resistor 77 in the base of transistor 55. A leakage suppression resistor 75 is connected around the emitter to base junction of transistor 55 for well known reasons. It will be recalled that transistor 51 is potentially turning on and off with the full wave bridge 46. Accordingly, as transistor 51 turns on and off, transistor 55 will, accordingly, pass current into resistors 78 and 79 through vairable resistor 80 to accordingly charge capacitor 81 connected to the negative bus line.

Capacitor 82 is connected across the anode to cathode junction of a programable unijunction transistor 82 through resistor 83. The gate of the unijunction transistor 82 is connected to a reference voltage provided by a voltage divider formed between resistors 84 and 85 connected between the positive and negative bus lines respectively. A filtering capacitor 86 is applied across resistor 85 for filtering effect.

In operation, as transistor 51 turns on, transistor 55 which has been potentially turned on will conduct through the resistor network formed of resistors 78, 79 and 80 to charge capacitor 81. As capacitor 81 reaches the firing potential of the unijunction transistor 82, transistor 82 will turn on and remain on until the end of the half cycle. During this turn on time, current is passed through the programable unijunction transistor 82 to the base circuits of a pair of transistors 87 and 88 which turn on the main welding current as will hereinafter be described.

A resistor 90 is placed in series with a diode 91 and both are interconnected between the positive side of capacitor 81 and ground. This circuit arrangement serves to discharge the charge on capacitor 81 following each turn off of transistor 51. Additionally, a capacitor 92 is interconnected between the junction of resistors 78 and 79 and ground to filter transients entering the circuits if variable resistor 80 is made remote.

Collector current is provided for transistors 87 and 88 from the positive bus 47 through conductor 92 and current limiting resistor 93. The emitter current from transistors 87 and 88 is passed through additional current limiting resistors 94 and 95 in conductors 96 and 97 to the gates of 1SCR and 2SCR respectively in the welding current bridge 10. During the operating sequence, the base current supplied by the unijunction transistor 82 will turn on transistors 87 and 88 supplying gate current to 1SCR and 2SCR. This current develops a gating potential across gate to cathode resistors 98 and 99 of 1SCR and 2SCR respectively and turns on the SCRs. Capacitors 100 and 101 across the gates to ground filter any transients. Once 1SCR and 2SCR are turned on, the welding bridge 10 will produce a full wave DC output for the remainder of the half cycle.

The power output of the welding bridge 10 may be controlled by the point in each half cycle at which the unijunction transistor 82 turns on. This is accomplished by variable resistor 80 which will vary the charging rate of capacitor 81 and thus accordingly the turn on time in each half cycle of the welding bridge 10.

It is to be recalled that the initiation of the turn on of the welding bridge 10 occurred upon the appearance of pilot arc current and the closing of reed relay contacts 3RR1 at which time the gun solenoid also moved to the retracted position. A small time delay is necessary upon the establishment of the pilot arc before the main welding current is established to provide for the retraction of the stud from the workpiece to prevent welding of the stud before retraction. This is accomplished in the present circuit by the provision of a capacitor 89 across resistor 71 in the circuit which turns on transistor 55. Capacitor 89 will maintain the potential at point 74 above turn on value for transistor 55 for a short duration following the closing of reed relay contacts 3RR1. Thereafter, the bias on the transistor 55 remains potentially on to permit phasing of the SCRs in the welding bridge 10.

Four series arrangements of resistors 102 and capacitors 103 are placed across all four arms of the welding bridge 10 to absorb transients and protect the diodes and SCRs in the bridge. A bleed resistor 104 is placed across the output of the bridge to provide a discharge path for the pilot arc capacitor 37 after turn off. Additionally, a delayed time circuit breaker 107 is placed across the output of the bridge via variable resistor 106 and resistor 105 to sense any extended output from the bridge indicating a bridge failure. Operation of the circuit breaker discontinues the power supply to the apparatus. A further safety feature employed is the utilization of a metaloxide varistor 108 between the resistor 43 and ground. The varistor is to absorb any extremely high voltage peaks which may be induced in the pilot arc choke 41.

The operation of the welding apparatus heretofore described has proceeded to the point where 3SCR has turned on and the pilot arc has been established thus turning on reed relays 1RR, 2RR, 3RR and 4RR. Relays 1RR and 2RR turn on the control bridge 11 to full wave to retract the gun solenoid. Additionally, reed relay 3RR closed contacts 3RR1 and initiated phasing in the welding bridge to turn on the welding current. Simultaneously, reed relay 4RR also pulls in and opens normally closed relay contacts 4RR1 and closes normally open relay contacts 4RR2 to initiate welding timing as hereinafter described.

Before proceeding with the discussion of the welding current timer, it should be noted that when 3SCR turned on, a discharge path for capacitor 60 across 3SCR is provided to reverse bias 4SCR. As 3SCR turns on, the energy in capacitor 60 will provide a sufficient reverse current across 4SCR to commutate the theretofore conducting SCR to a nonconducting state. Additionally, the energy discharge of the capacitor 60 is applied across the current path formed by diode 109, resistor 110 and diode 111 to the opposite side of the capacitor. This current path functions to drop the potential at the anode of silicon unilateral switch 112 to below ground to insure turn off of the semiconductor device at the time of commutation of 4SCR. A series resistor 123 and capacitor 122 across 4SCR filters transients.

At this point in the sequence being the turning on of 3SCR and commutating of 4SCR off, the potential at the anode of 4SCR rises toward the value of the charge on capacitor 28. The voltage rise at point 113 produces a current flow across timing resistor 114 and current limiting resistor 115 to begin charging of a timing capacitor 116. When capacitor 116 has charged to the firing point of silicon unilateral switch 112, the energy in the capacitor is discharged through current limiting resistor 117 and dropped across gate to cathode resistor 34 to again turn on 4SCR. At this time, inasmuch as pilot arc current has been established, reed relay contacts 4RR1 are open removing the ground from the timing capacitor 116 permitting it to charge and also reed relay contacts 4RR2 have closed clamping the anode of silicon unilateral switch 33 toward ground to prevent it from turning on.

When 4SCR turns on, the commutating capacitor 60 will discharge in a reverse current path through 4SCR and reverse bias 3SCR commutating the SCR off. If the trigger is still being held closed at this time maintaining contact CR1 closed, 3SCR will not be turned on again. The potential upon capacitor 59 has been held essentially to ground through diode 118 while 3SCR was on. Additionally, once 3SCR turns off, the potential on capacitor 59 cannot rise to the turn on voltage while CR1 contacts are held closed.

Another feature of the welding apparatus of FIG. 1 is that, in the event that the hammering of the stud against the workpiece does not break through the scale within a predetermined time to establish a pilot arc, then the hammering will be stopped. This can be demonstrated by first assuming that the trigger has been pulled and CR has closed relay contact CR1 turning on 3SCR as above described. As 3SCR turns on, 4SCR is commutated off as above described thus causing a rise in the anode potential of 4SCR. Hammering of the stud is now accomplished by the half wave passing through the gun solenoid.

At this point in the cycle, relay 4RR has not pulled in since no pilot arc current has been established. As the potential rises at the anode of 4SCR, a current path is provided through resistor 31 to ground across timing capacitor 119. As capacitor 119 charges, the potential at point 120 will rise until the firing voltage is obtained to turn on silicon unilateral switch 33 which, in turn, applies a gating potential to turn on 4SCR which commutates 3SCR off discontinuing the cycle. The RC timing constant for resistor 31 and capacitor 119 is set preferably within a range between one and two seconds. It is believed that if the stud has not made electrical contact within this time period, then the cycle should be discontinued and the matter investigated. However, under normal operating conditions, the stud will break through the resistance and relay contacts 4RR1 and 4RR2 open and close respectively to discharge the building charge on capacitor 119 and remove the ground from the welding timer capacitor 116 to commence initiation of the weld timing.

Figure 2:
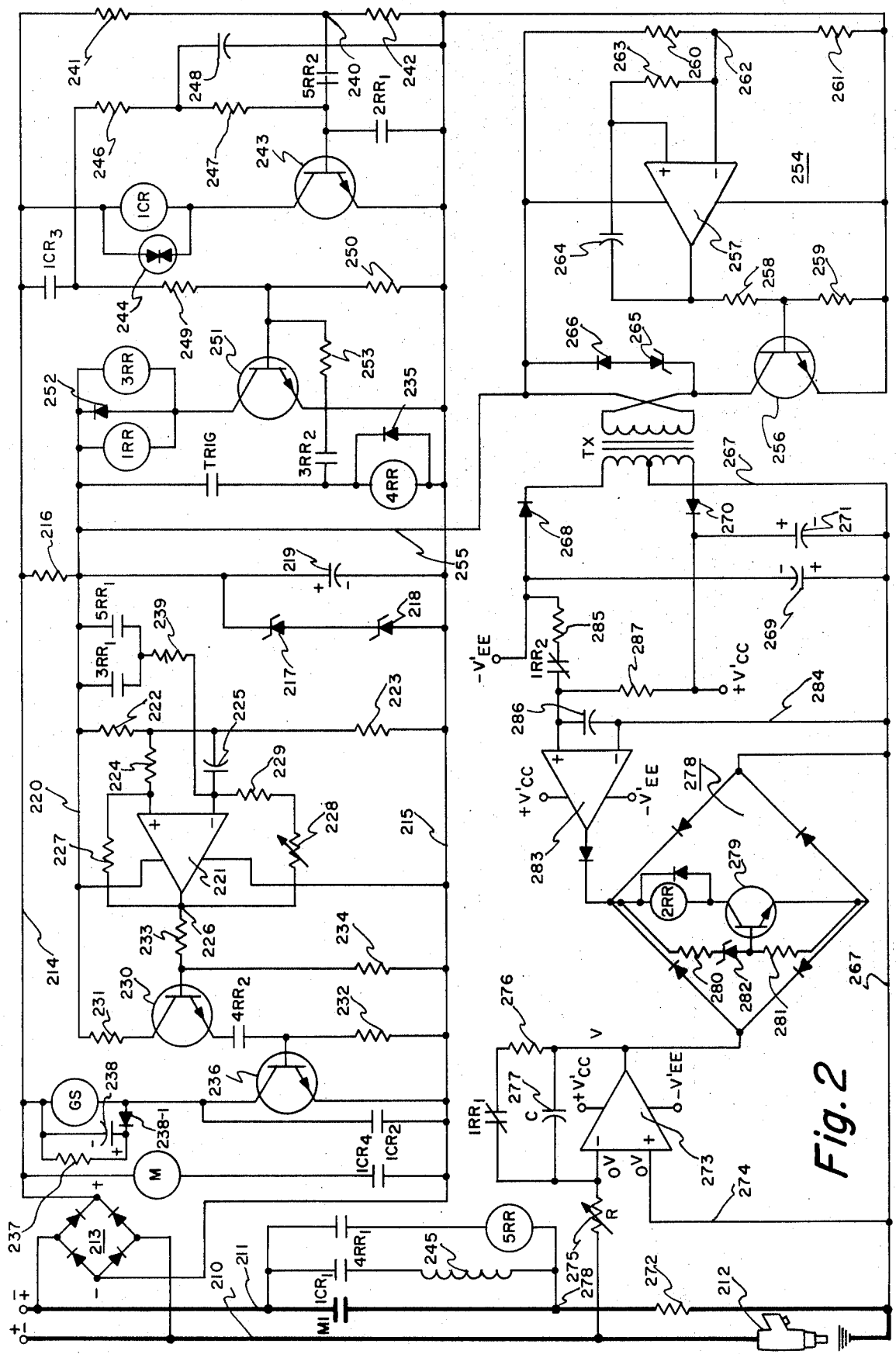
FIG. 2 is a schematic of an entire stud welding apparatus operating from a DC power supply including a second embodiment of hammering circuit according to the present invention.

A second embodiment of the hammering circuit of the present invention is shown in FIG. 2 of the drawings. In FIG. 2, there is shown the entire circuitry for utilizing the hammering circuit in conjunction with a DC power supply.

The power supply for the welding apparatus shown in FIG. 2 is a DC source and is applied via welding conductors 210 and 211 to the welding gun 212. The power supply is provided with plug in terminals of a nature that the terminals can be reversed to either positive or negative polarity according to the particular circumstances under which the apparatus is being used and the desires of the operator.

The reverse polarity conditions are taken into account by the utilization of a bridge 213 which provides a positive output along a positive bus line 14 and a return ground negative line 15. In this manner, the proper polarity of control voltage is maintained irrespective of the polarity of the welding current itself.

The output of the bridge 213 is in the area from 60 to 110 volts DC and provides one of the power supplies for the operation of the welding circuitry. A second control voltage is obtained by means of a resistor 216 in series with two series zener diodes 217 and 218 connected between the positive and negative buses 14 and 15 respectively. A filtering capacitor 219 is placed across the zener diodes 217 and 218 to provide filtering. Resistor 216 is connected intermediate the resistor and zener diodes to a second positive bus line 220. The potential on the bus line 220 is determined by the breakdown voltage of the zener diodes 217 and 218 and is approximately 13.6 volts.

Both the potential on the positive bus lines 214 and the lower voltage bus line 220 appear in the circuit as soon as the power supply is turned on and remain until the power supply is turned off.

Hammering of the gun solenoid is accomplished in the circuit arrangement of FIG. 2 by the utilization of an operational amplifier 221. The operational amplifier is an integrated circuit assembly and may be of the type, for example, Signetics No. N5741.

The operational amplifier 221 is powered from the positive bus 220 and is connected to negative bus 215. A voltage divider formed of resistors 222 and 223 disposed across the 13.6 volt power supply provides the noninverting input for the amplifier through current limiting resistor 224. The inverting input to the amplifier is connected through a capacitor 225 to the midpoint of the voltage divider formed by resistors 222 and 223.

The output of the amplifier at point 226 is returned by way of a positive feedback resistor 227 to the noninverting input. In a like manner, the output at point 226 is applied to the inverting input by a current path formed by variable resistor 228 and resistor 229.

In operation, the input offset voltage of the amplifier is approximately 2 millivolts. Whenever the power supply is turned on, the appearance of a voltage at the midpoint of the voltage divider formed by resistors 222 and 223 will be applied by resistor 224 to the noninverting input of the amplifier. This potential applied to the noninverting input of the amplifier will cause the potential on the inputs to exceed the input offset voltage and drive the amplifier either positive or negative.

Assume a positive voltage at the noninverting input relative to the inverting input has exceeded the offset voltage. This will cause the amplifier to start driving toward positive output at point 26. As this occurs, the positive going voltage will become a positive feedback through resistor 27 driving the noninverting input further positive until full output of the amplifier is achieved. While this is occurring, the positive potential appearing at point 26 is also being fed through variable resistor 28 and resistor 29 and is charging capacitor 25. The value of resistors 27 and 24 is such that the minimum potential obtainable at the noninverting input is less than that to which the capacitor 25 will charge to through resistors 28 and 29. Accordingly, after the time interval determined by the RC time constant of the series resistance 28 and 29 and capacitor value 25, a voltage will be reached at the inverting input which will exceed the appearing at the noninverting input by a margin greater than the offset voltage of the amplifier. When this occurs, the amplifier will now start driving toward negative with the effect that the negative going voltage at point 26 will continue to be a positive feedback to pull down the voltage at the noninverting input causing the amplifier to drive further toward the negative until the minimum voltage essentially at ground is reached. At this point, the amplifier will be at rest until the voltage on capacitor 25 has sufficiently dissipated to a point at which the potential at the inverting input is below the potential at the noninverting input beyond the offset voltage. When this occurs, the amplifier will again swing toward the positive with continuing repetitive cycling. The form of output of the amplifier is essentially a square wave.

The collector-emitter circuit of a first transitor 230 is connected across the lower voltage power source by means of a current limiting resistor 231 in the collector circuit and through reed relay contacts 4RR2 and resistor 232 to ground. The square wave output from the amplifier 221 is applied to the base of transistor 230 at the juncture of base resistors 233 and 234 which are across the output of the amplifier 221 and ground. At this point in the sequence of operations, which is essentially prior to triggering, amplifier 221 will be cycling transistor 230 between potentially on and off stages in accordance with the frequency output of the amplifier 221. The frequency of oscillation of the amplifier is chosen in a normal range of between 10 to 60 cycles per second and can be varied by adjustment of the variable resistor 228.

The sequence of operations for the welding apparatus shown in FIG. 2 is initiated by closing the trigger (trig). When the trigger is closed, a circuit is completed through reed relay 4RR energizing the relay. A reverse current diode 235 is placed in parallel with the reed relay and absorbs the back emf of the relay upon deenergization.

When reed relay 4RR pulls in, it simultaneously closes relay contacts 4RR1 and 4RR2.

Relay contacts 4RR2 should be considered first. As these contacts close, the emitter current from transistor 230 is applied across resistor 232. Transistor 230 is turning on and off in accordance with the output of the amplifier 221. Accordingly, a cycling input is applied to the base of a second transistor 236.

Transistor 236 has its collector-emitter circuit in series with the gun solenoid both of which are across the higher voltage output of bridge 213 and ground. The cycling input to the base of resistor 236 will, accordingly, turn transistor 236 on and off. As this occurs, current through the gun solenoid will likewise be turned on and off causing the solenoid to retract and drop out in accordance with the output frequency of amplifier 221 to thus effect a hammering action of the stud upon the workpiece. A resistor 237 and capacitor 238 are both connected in parallel across the gun solenoid through the diode 238–1 and aid in absorbing the back emf of the gun solenoid to dissipate the energy in the gun solenoid during the hammering sequence.

Reed relay contacts 4RR1 also close simultaneously with the initiation of the hammering of the stud. Reed relay contacts 4RR1 are connected across the main contactor contacts M1 and the pilot arc contacts 1CR1 of which are, at this time, open. A further reed relay 5RR is in series with the reed relay contacts 4RR1.

Repeated hammering of the stud upon the workpiece will ultimately result in the establishment of good electrical contact. When this electrical contact is established, the DC power source will find a completed path through reed relay contacts 4RR1, reed relay 5RR and across the stud and workpiece. As this occurs, reed relay 5RR1 will be energized and close reed relay contacts 5RR1 and 5RR2. It is to be noted that the hammering will continue in the embodiment shown in FIG. 2 until good electrical contact is established thus pulling in reed relay 5RR.

The effect of the fast closing of reed relay contacts 5RR1 will be considered first. As these contacts are closed, the voltage on the positive bus 220 will be applied through resistor 239 to the inverting input of the amplifier 221. As this occurs, the inverting input will be driven positive driving the output of the amplifier toward ground. The value of resistor 239 is such that the positive potential applied the inverting input of amplifier 221 will remain higher than that to which the noninverting input will rise across resistors 227 and 224. Accordingly, the amplifier 221 will be driven to the low output and will be clamped at that position thus ceasing any further hammering action of the gun solenoid. Reed relay contacts 5RR1 close and discontinue the hammering action before the stud can complete another cycle thus preventing welding of the tip of the stud by the pilot arc.

Reed relay contacts 5RR2 close simultaneously with reed relay contacts 5RR1. When reed relay contacts 5RR2 close, the positive potential at point 240 developed between resistors 41 and 42 of the voltage divider across the higher control voltage will be applied to the base of a further transistor 243. The emitter collector circuit of transistor 243 is in series with control relay 1CR and connects this relay across the higher control voltage. As reed relay contacts 5RR2 close, transistor 243 is turned on and control relay 1CR energized. A thyrector diode 244 is placed across control relay 1CR to absorb the inductance of the windings of the relay upon dropping out.

When 1CR is energized, its associated relay contacts 1CR1, 1CR2, 1CR3 and 1CR 4 all simultaneously close and a series of control functions are performed. First, when 1CR1 closes, the pilot arc current is turned on through the pilot arc choke 245 and establishes the pilot arc across the stud and workpiece.

While the pilot arc is being established, contacts 1CR2 also close shunting transistor 236 and causing the gun solenoid to fully retract and hold in that position. While this is occurring, contacts 1CR4 also close energizing the main contactor relay M. The main contactor, being a larger contactor and having a greater inertia, closes a predetermined time after the establishment of the pilot arc and lifting of the gun solenoid and in this manner prevents the establishment of the main welding arc prior to the lifting of the stud.

Further occurring in this simultaneous sequence is the closing of relay contacts 1CR3. As these relay contacts close, the higher voltage source is applied through resistors 246 and 247 to the base of transistor 243 to hold the transistor on and provide an interlock around relay contacts 5RR2. This is necessary inasmuch as once relay contacts 1CR1 and ultimately the main welding contactor ML close, relay 5RR will be shorted and will drop out. A capacitor 248 is interconnected between the junction of resistors 246 and 247 to ground for filtering purposes.

When relay contacts 1CR3 close, a current path is also established through series resistors 249 and 250 to ground. The midpoint between resistors 249 and 250 is interconnected to the base of a further transistor 251 and biases that transistor on. Two further reed relays, 1RR and 3RR are placed in parallel in the emitter-collector circuit of transistor 51 which is connected between the lower voltage source and ground. As transistor 251 turns on, both reed relays 1RR and 3RR are energized. A reverse diode 252 in parallel with both reed relays 1RR and 3RR absorbs the back emf of the reed relays on dropping out.

When reed relay 3RR is energized, it closes its two sets of associated contacts, 3RR1 and 3RR2. Reed relay contacts 3RR1 are placed in parallel with reed relay contacts 5RR1 and serve to hold the inverting input of the operational amplifier 221 to a high level to prevent operation of the amplifier as in the case of contacts 5RR1. Reed relay contacts 3RR1 are necessary inasmuch as once the pilot arc is established by closing of contacts 1CR1 as well as closing of the main welding contacts M1, relay 5RR will be shunted and thus reed relay contacts 5RR1 which were previously holding the operational amplifier 221 off, will open. The operation of reed relay 3RR is sufficiently fast to close and maintain the inverting input high holding the amplifier off prior to the opening of reed relay contacts 5RR1.

Reed relay contacts 3RR2 are connected in series with resistor 253 and complete a current path from the lower voltage source to the base of transistor 251 to hold 1RR and 3RR on until the trigger is released for a reason to be later explained.

At this point in the welding cycle, the hammering has been accomplished and electrical contact established. As soon as electrical contact was established, the pilot arc commenced, the gun solenoid retracted the stud from the workpiece and the main welding contactor closed establishing the main welding current. The duration of the welding arc will continue until a predetermined quantity of electrical current has passed across the stud and workpiece as determined by a metering circuit which will now be described.

It is to be recalled that the power supply for the welding apparatus shown in FIG. 2 can be connected for either polarity. This produces a particular problem in respect to the metering of the welding current due to the reversal of the polarity or direction of flow of the current in the main welding conductor. In order to overcome this problem, the welding apparatus shown in FIG. 2, in general, employs an inverter which produces both a negative and a positive output swing around a common ground. This negative and positive output of the inverter is then employed in conjunction with an integrating circuit, operational amplifier and bridge network for metering the welding current energy as hereinafter described.

The inverting circuit generally designated 254 is powered from the lower voltage positive bus line 220 through conductor 255 which completes a current path through the primary of transformer TX and the collector-emitter circuit of transistor 256 to ground. A second operational amplifier 257 of generally the type as amplifier 221 is utilized to drive the base circuit of transistor 256 through a voltage divider including resistors 258 and 259.

Operational amplifier 257 is powered by the lower voltage source as indicated in FIG. 2. A voltage divider is formed across the lower voltage source by resistors 260 and 261 providing a midpoint voltage at point 262. This midpoint voltage at point 262 is applied directly to the inverting input of the amplifier 257 and through a resistor 263 to the noninverting input. A capacitor 264 is interconnected between the output of the amplifier and the noninverting input and provides a positive feedback loop.

The amplifier 257, in operation, will be driven toward its negative output as soon as the power source is turned on due to the direct application of the midpoint voltage at point 262 to the inverting input. As this is occurring, capacitor 264 will be charging through resistor 263. Once the amplifier has reached its low state, the charge on capacitor 264 will place the noninverting input at a voltage close to that of the inverting input and consequently the amplifier will swing in the reverse direction with a positive feedback through capacitor 264. The cycle is repetitive and the output of the amplifier will be approximately a square wave.

The square wave output of amplifier 257 will, as above described, turn transistor 256 on and off thus creating a pulsating current through the primary of transformer TX. A series zener diode 265 and diode 266 placed in parallel with the primary of transformer TX permits the continuation of flow of current in the primary of transformer TX when transistor 256 turns off.

The secondary of transformer TX is center tapped through conductor 267 which leads to and forms the metering circuit ground. A first diode 268 and capacitor 269 combination connected between one end of the secondary of transformer TX and ground provides the —V'ee filtered output from the inverter which swings below the metering ground. In a like manner, a second series combination of diode 270 and capacitor 271 connected between the opposite end of the secondary of transformer TX and ground provides the filtered positive output for the inverter establishing the +V'cc voltage.

The welding energy metering circuit of the present invention is shown in the lower left hand side of FIG. 2. The circuitry includes a metering resistor 272 in series with the main welding conductor. A further operational amplifier 273 of the general type before described is employed. The noninverting input to this amplifier is strapped to ground through conductor 274. The inverting input is connected through a variable resistor 275 to the main welding conductor at a point 278 placing both inputs across the metering resistor 272. The power sources for the amplifier 273 are the positive and negative outputs of the inverter as indicated in FIG. 2.

It is to be recalled that at this point in the welding cycle being described, the main welding contactor has closed delivering the welding energy across the stud and workpiece and reed relay 1RR has been energized essentially simultaneously with the closing of the main welding contactor. Reed relay 1RR includes 1RR1 contacts which are in series with a resistor 276, the combination of which is placed across the inverting input and the output of amplifier 273. Additionally, an integrating capacitor 277 is placed in parallel with the series combination of reed relay contacts 1RR1 and resistor 276 and also across the inverting input and the output of amplifier 273.

In operation, before the main welding contactor M1 is closed and reed relay 1RR energized, reed relay contacts 1RR1 are closed and any charge on capacitor 277 is removed. Once the main welding contactor has closed and reed relay 1RR1 energized opening reed relay contacts 1RR1, then a voltage will appear across metering resistor 272 of a polarity depending upon the connections to the power supply. Assuming first that the conductor 211 is positive, then a positive voltage will appear at point 278 with respect to the monitoring ground line 267 which voltage will be representative of the current being dissipated across the stud and workpiece. This positive voltage will produce a current flow through variable resistor 275 which will be integrated in capacitor 277. Prior to the appearance of the metering voltage, the output of amplifier 273 was essentially at monitoring ground level or zero. After a predetermined amount of current has been integrated in capacitor 277, the inverting input to the amplifier 273 will attempt to go below the ground level to which the noninverting input has been strapped and consequently the output of amplifier 273 will drop below the monitoring ground on line 267.

The output of amplifier 273 is connected to a bridge arrangement 278. A further reed relay 2RR is connected in series with the collector-emitter circuit of a transistor 279 across the output of bridge 278. A voltage divider network formed of resistors 280 and 281 together with zener diode 282 are placed in parallel with reed relay 2RR and transistor 279, as shown in FIG. 2, and provide the base triggering circuit for transistor 279.

The output from amplifier 273, representing the integration of a predetermined quantity of welding energy, is applied to bridge 278. The resultant output of bridge 278 is across reed relay 2RR thus energizing the relay.

Reed relay 2RR includes relay contacts 2RR1 in the base-emitter circuit of transistor 243. When reed relay contacts 2RR1 close, the base to emitter junction of transistor 243 is shorted and transistor 243 is turned off. When transistor 243 turns off, control relay drops out opening its associated contacts 1CR1, 1CR2, 1CR3 and 1CR4.

Assuming, for the moment, that the power source was connected to the reverse polarity just described. In that case, point 278 would go negative with respect to the ground line 267. However, the negative flowing current through resistor 275 will be integrated across capacitor 277. At the end of the integration cycle, the output of the amplifier 273 will go positive. This positive going potential at the output will cause current to flow, in a reverse direction, through the bridge 278 to likewise energize reed relay 2RR as above described.

When relay 1CR drops out, contacts 1CR4 will open dropping out the main welding contactor as well as contacts 1CR1 opening discontinuing the pilot arc. Further, relay contacts 1CR2 will open causing the solenoid to deenergize plunging the stud to the workpiece to complete the welding of the stud to the workpiece. Lastly, contacts 1CR3 will open and the bias on transistor 251 will be removed turning the transistor off thus deenergizing reed relays 1RR and 3RR which resets the metering timer and returns the operational amplifier 221 to its square wave output. However, it is to be noted that if the trigger were still being held depressed, transistor 251 would not turn off due to the base current passing through reed relay contacts 3RR2. Accordingly, reed relay 3RR would remain energized and the amplifier 221 will not be turned on until the trigger is released. In this manner, repetition of the welding cycle cannot be initiated until the trigger has been completely released.

The welding apparatus shown in FIG. 2 further employs a safety timer to discontinue the flow of welding current in the event of failure of the welding timer. This safety circuit employs a further operational amplifier 283 of the type described which is connected across the positive and negative inverter voltages as indicated. The inverting input to the amplifier 283 is strapped to the metering ground through a conductor 284. The noninverting input is connected through reed relay contacts 1RR2 and resistor 285 to the negative output of the inverter. A capacitor 286 is interconnected between the two inputs to the amplifier 283. Lastly, the noninverting input is connected to the positive output of the inverter through resistor 287.

In operation, normally closed reed relay contacts 1RR2 will maintain the noninverting input to the amplifier strapped to −V'ee until the contacts are opened. Reed relay contacts 1RR2 are opened simultaneously with the initiation of the welding current. When these contacts open, the noninverting input of the amplifier swings positive through resistor 287 after a predetermined charging time of capacitor 286. As this occurs, the amplifier which has previously been held to a negative output now swings to a positive output which passes through bridge 278 and energizes reed relay 2RR to discontinue the welding cycle as in the case of an output from the metering timing circuit previously described.

From the foregoing description of the welding apparatus shown in the embodiments of FIGS. 1 and 2, it is to be appreciated that circuitry has been shown which provides a means for penetrating paint or scale or other resistive material to establish good electrical contact between the stud and workpiece. The circuitry employed, in the first embodiment, may be used with an AC power supply while the second embodiment of hammering circuitry may be employed with a DC power supply. Additionally, it is to be appreciated that the hammering circuit of the present invention, in the first embodiment, senses the establishment of good electrical contact by sensing the occurrence of a pilot arc while, in the second embodiment, the establishment of good electrical contact is sensed by measuring the resistance across the stud and workpiece. It is further to be appreciated that the hammering circuit in the first embodiment further employs means to time the hammering action and discontinue the hammering after a predetermined time.

The foregoing description of the two embodiments of hammering circuit of the present invention has been made in respect to the specific circuitry shown in the drawings and as described. However, by reason of the foregoing disclosure, other embodiments and modifications of the invention will become apparent to those skilled in the art and, accordingly, no limitation as to the scope and breadth of the invention is intended by the specific embodiments shown and described.

I claim:

1. An electric stud welding apparatus having a stud welding gun including a welding chuck for holding a stud to be welded to a workpiece and a source of electrical energy to effect welding of the stud to the workpiece, the improvements comprising: hammering means for reciprocating the welding chuck to repeatedtively engage and disengage the stud from the workpiece to effect good electrical contact of the stud with the workpiece; and sensing means for sensing the electrical resistance across the stud and workpiece and responsive to a predetermined level of resistance to discontinue operation of the hammering means.

2. The welding apparatus of claim 1 further including timing means operable after a predetermined time to discontinue operation of the hammering means.

3. An electric stud welding apparatus having a stud welding gun including a welding chuck for holding a stud to be welded to a workpiece and a source of electrical energy to effect welding of the stud to the workpiece, the improvements comprising:

hammering means for reciprocating the welding chuck to repeatedtively engage and disengage the stud from the workpiece to effect good electrical contact of the stud with the workpiece; and sensing means responsive to establishment of a predetermined current level across the stud and workpiece for discontinuing operation of the hammering means.

4. The welding apparatus of claim 3 further including timing means operable after a predetermined time to discontinue operation of the hammering means.

5. The stud welding apparatus of claim 3 further including a pilot arc circuit and wherein the pilot arc potential is on during hammering and the sensing means senses the establishment of pilot arc current.

6. The stud welding apparatus of claim 3 including a lifting solenoid operable during the normal welding cycle to effect lifting and plunging of the stud and wherein the hammering means includes the lifting solenoid.

7. The stud welding apparatus of claim 6 further including an AC power source including a full wave rectifier; control means for converting the full wave rectifier to half wave output; wherein the lifting solenoid is driven by the rectifier and responsive to full wave output to lift and hold but responsive to half wave output to cyclically pull in and drop out; and wherein said control means is responsive to said sensing means to convert the rectifier to full wave output and discontinue the hammering means and initiate the normal welding cycle upon establishment of welding current.

8. The stud welding apparatus of claim 6 further including a DC power source for energizing the lifting solenoid and circuit interrupter means in circuit with the power source for cyclically interrupting the DC power to the lifting solenoid to effect hammering.

9. The welding apparatus of claim 8 wherein the sensing means is operable upon the occurrence of a predetermined current level across the stud and workpiece to discontinue operation of the circuit interrupter means and initiate the welding cycle.

10. The welding apparatus of claim 9 where in the circuit interrupter means includes a semiconductor device in circuit with the DC power source and a frequency variable multivibrator driving the semiconductor device.

11. The welding apparatus of claim 9 further including timing means operable after a predetermined time to discontinue operation of the hammering means.

* * * * *

UNITED STATES PATENT OFFICE
CERTIFICATE OF CORRECTION

Patent No. 3,825,717                           Dated July 23, 1974

Inventor(s) James S. Hughes, Jr.

It is certified that error appears in the above-identified patent and that said Letters Patent are hereby corrected as shown below:

Column 4 line 41 "SCR" should be ---3SCR---.

Column 4 line 49 "magnitism" should be ---magnetism---.

Column 5 line 30 "vairable" should be ---variable---.

Column 5 line 33 "82" should be ---81---.

Column 9 line 11 "mini-" should be ---maxi- ---.

Column 9 line 18 "the" at its first occurrence should be ---that---.

Column 10 line 36 after "applied" insert ---to---.

Column 13 line 60 after "relay" insert ---1CR---.

Signed and sealed this 11th day of February 1975.

(SEAL)
Attest:

RUTH C. MASON
Attesting Officer

C. MARSHALL DANN
Commissioner of Patents
and Trademarks